United States Patent
Trice et al.

(10) Patent No.: US 11,619,590 B2
(45) Date of Patent: Apr. 4, 2023

(54) METHOD AND COMPOSITION FOR DETECTING AND QUANTIFYING FILMING AMINES IN LIQUIDS

(71) Applicant: Taylor Technologies, Inc., Sparks, MD (US)

(72) Inventors: Brian Trice, Phoenix, MD (US); Heather Drake, Fallston, MD (US)

(73) Assignee: Taylor Water Technologies LLC, Sparks, MD (US)

( * ) Notice: Subject to any disclaimer, the term of this patent is extended or adjusted under 35 U.S.C. 154(b) by 169 days.

(21) Appl. No.: 17/166,685

(22) Filed: Feb. 3, 2021

(65) Prior Publication Data

US 2021/0239620 A1    Aug. 5, 2021

Related U.S. Application Data

(60) Provisional application No. 62/969,369, filed on Feb. 3, 2020.

(51) Int. Cl.
| | |
|---|---|
| *G01N 33/569* | (2006.01) |
| *G01N 1/22* | (2006.01) |
| *G01N 15/06* | (2006.01) |
| *G01N 33/543* | (2006.01) |
| *G01N 15/00* | (2006.01) |
| *G01N 21/78* | (2006.01) |
| *G01N 31/22* | (2006.01) |

(52) U.S. Cl.
CPC ............. *G01N 21/78* (2013.01); *G01N 31/22* (2013.01)

(58) Field of Classification Search
CPC ........ G01N 21/78; G01N 31/22; G01N 21/80; G01N 31/221

See application file for complete search history.

(56) References Cited

U.S. PATENT DOCUMENTS

| | | |
|---|---|---|
| 3,029,125 A | 4/1962 | Hummel |
| 9,588,090 B2 | 3/2017 | Lendi |
| 2016/0091469 A1* | 3/2016 | Lendi .................. G01N 21/253 436/85 |
| 2021/0123867 A1* | 4/2021 | Jasper .................. G01N 21/78 |

OTHER PUBLICATIONS

Klucel™ hydroxypropylcellulose—Ashland; https://www.ashland.com/file_source/Ashland/Product/Documents/Pharmaceutical/PC_11229_Klucel_HPC.pdf (Year: 2010).*

* cited by examiner

*Primary Examiner* — Jennifer Wecker
*Assistant Examiner* — Oyeleye Alexander Alabi
(74) *Attorney, Agent, or Firm* — Royal W. Craig; Gordon Feinblatt LLC

(57) ABSTRACT

A composition and method for the photometric determination of a film-forming amine in liquid by adding an indicator reagent to an aqueous system that is pH dependent, combining a water soluble non-ionic polymer to modify the physical properties of the aqueous system, and adding an acidic buffer to said aqueous system to lower pH and activate said indicator, said water soluble polymer keeping the filming amine/indicator complex in solution despite the acidic buffer and preventing it from precipitating out.

18 Claims, No Drawings

METHOD AND COMPOSITION FOR DETECTING AND QUANTIFYING FILMING AMINES IN LIQUIDS

CROSS-REFERENCE TO RELATED APPLICATIONS

The present application derives priority from U.S. Provisional Patent Application 62/969,369 filed 3 Feb. 2020.

BACKGROUND OF THE INVENTION

1. Field of the Invention

The present invention relates generally to chemical testing methods and compositions and, more particularly, to a simple, rapid and accurate test method and composition for quantifying filming amines in water.

2. Description of the Background

The use of fully oxyalkylated long chain hydrocarbon filming amines as corrosion inhibitors in different kinds of systems is well known. For example, amines are used as corrosion inhibitors and scale inhibitors in industrial plants and installations which employ water for the steam production, heat transfer, or evaporation processes. These "filming amines" work by forming a film on metal surfaces that adheres even when carboxylic acid polymers such as maleic, vinylic or acrylic polymers or copolymers are also present. For example, U.S. Pat. No. 3,029,125 shows a process for inhibiting corrosion in steam and condensate return systems using alkylene diamines. A variety of amine corrosion inhibitors have been developed to be used in the presence of freshwater, seawater or brine.

The amount of filming amine required to bring about a desired surface protection is small, on the order of about 0.5 to 100 mg/l of water supply. However, treatment is sensitive to overdoses and underdoses, and so it is important to test the amount of filming amines in water and other liquids. The level of filming amines in liquid samples can be ascertained by gas chromatography but this requires heavy and complicated equipment, and longer processing times, neither of which is practicable in industry. There are also photometric methods of detection. In one method, the polyamine is complexed with methyl orange, and the intensity of the yellow color which forms is measured at a wavelength of 430 nm against a reagent blank. Another method comprises addition of disulfine blue, e.g. VN 150, and measuring the absorption curve at a wavelength of 625 nm in a chloroform solution against a standard reagent like HYAMINE 1622 (available from Rohm and Haas). Yet another method is based on a set of rose bengal reagents, which together react with the polyamine corrosion inhibitor to produce a pink coloration. rose bengal forms a colored complex with filming amines. The absorbance of this complex is proportional to the concentration of filming amines. The intensity (absorbance) of the pink complex is measured at 560 nm and is directly proportional to the level of filming amine active in the sample. The results are expressed as parts per million (ppm). However, this method is very pH sensitive and so after the reagent addition of the rose bengal the pH of the sample must be lowered to between 2.3 and 3.3. This is described in U.S. Pat. No. 9,588,090 to Lendi issued Mar. 7, 2017 which shows a method for the determination of film-forming amines in liquids by adding a reacting agent with the amine to form a colored complex to be measured by photometry. The pH of the liquid mixture is lowered by using hydrochloric acid. The disadvantage of this method is that the filming amine/rose bengal complex is not water soluble and will gradually precipitate out of solution. As the precipitate forms it interferes with the colorimeter results. This makes getting an accurate and reproducible absorbance reading difficult. The '090 patent describes including a wetting agent (non-ionic tenside), also referred to as an acid resistant detergent to prevent forming a deposition within the mixing chamber. The presence of a wetting agent or detergent prevents the deposition of the filming amine/rose bengal complex by lowering surface tension and increasing solubility. However, one disadvantage to using a wetting agent or other surfactant is that they are prone to forming bubbles and foam. Bubbles or foam also interferes with the colorimeter absorbance measurement and may cause inaccurate results. What is needed is a method and composition for detecting and quantifying filming amines in liquids that implements rose bengal and, despite the pH of the sample being lowered keeps the rose bengal/filming amine complex in solution, preventing it from precipitating out and without introducing foam or bubbles to the sample.

SUMMARY OF THE INVENTION

Accordingly, it is an object of the present invention to provide an improved method and composition for detecting and quantifying filming amines in liquids that implements rose bengal and, despite the pH of the sample being lowered keeps the rose bengal/filming amine complex in solution, preventing it from precipitating out.

Another object is to provide an improved method and composition for detecting and quantifying filming amines in liquids that adds a water-soluble polymer (hydroxypropyl cellulose) for a more accurate and repeatable absorbance reading.

Another object is to provide the optimum polymer at the optimum concentration to keep the rose bengal/filming amine complex soluble without disrupting the complex.

Still another object is to provide the method and composition as described above without introducing foam or bubbles to the sample (which can happen with certain polymers and surfactants).

These and other features and benefits are achieved with an improved method and composition for detecting and quantifying filming amines in liquids using an indicator that is pH dependent, an acidic buffer to lower pH, plus a water soluble polymer to modify the physical properties of the aqueous system by gellation, thickening or emulsification/stabilization, thereby keeping the reagent complex in solution despite the acidic buffer and preventing it from precipitating out. This facilitates a more accurate and repeatable absorbance reading. In a preferred embodiment the reagent complex includes rose bengal, the acidic buffer is a citrate buffer, and the aqueous modifier is a non-ionic polymer such as, for example, hydroxypropyl cellulose. After the acidic buffer is added, the filming amine complexes with rose bengal and presents a darker pink color, indicating the concentration of the filming amine. The right polymer at the right concentration keeps the rose bengal/filming amine complex soluble without disrupting the complex and avoids introducing foam or bubbles to the sample which can happen with certain polymers and surfactants. Other natural or synthetic water-soluble non-ionic polymers may also suffice. They can be natural (isolated from plant, microbial or animal sources), semisynthetic, or synthetic. Natural water-soluble polymers may be used as-is or modified. Semisynthetic water-soluble polymers are derived by either chemical modification of natural polymers or from microbial sources. Derivatives are obtained by substitution, oxidation, cross-linking, or partial hydrolysis. The products from animal sources are proteinaceous analogs of the more commonly used polysaccharide-based vegetable polymers. For a more complete understanding of the invention, its objects and advantages, refer to the remaining specification.

DETAILED DESCRIPTION OF THE PREFERRED EMBODIMENTS

The present invention is simple, rapid and accurate test method and multicomponent reagent system useful in determining the concentration of filming amines in a liquid sample. The reagent system uses an indicator that is pH dependent, an acidic buffer, plus an aqueous modifier to keep the filming amine complex in solution despite the buffer, preventing it from precipitating out. This complex facilitates a more accurate and repeatable photometric absorbance reading.

In a preferred embodiment the reagent includes rose bengal, the buffer is citrate, and the aqueous modifier is a non-ionic hydrophilic polymer such as, preferably hydroxypropyl cellulose (HPC). While other indicators and buffers may be used, rose bengal and citric acid are preferred.

Other suitable non-ionic hydrophilic polymers according to the invention may be selected from the group consisting of hydroxyethylcellulose (HEC); and poly(ethylene)oxide (PEO). Suitable HPC and HEC polymers are commercially available from Hercules Incorporated, Aqualon Division under the tradenames NATROSOL™ and KLUCEL™, respectively. PEO polymers are available from Dupont Company under the tradename POLYOX™. The right polymer at the right concentration is important to keep the rose bengal/filming amine complex soluble without disrupting the complex. The non-ionic hydrophilic polymer helps to avoid introducing foam or bubbles to the sample which can happen with certain other wetting agents or surfactants. Thus, the presently preferred test reagents includes both an indicator reagent A and buffer reagent B composed as set forth below.

Filming Amine Indicator—Reagent A
0.05% Rose Bengal
0.3% Hydroxypropyl Cellulose MW 100,000
10% Ethyl Alcohol SD-30
89.65% Deionized Water
To Compose:
Fill a 1 liter container approximately 60% with deionized water (DIW).
Add 3.0 g Hydroxypropyl cellulose MW 100,000.
Mix thoroughly while heating to dissolve.
Let cool completely.
Add 0.5 g Rose Bengal.
Mix thoroughly.
Add 100 ml Ethyl Alcohol SD-30. Mix thoroughly.
Let cool completely.
Dilute to 1000 mL with Deionized Water.
Filming Amine Buffer—Reagent B
15% Citric Acid Monohydrate
85% Deionized Water
To Compose:
Fill a 1 liter container approximately 60% with deionized water (DIW).
Add 150 grams Citric Acid Monohydrate.
Stir until dissolved.
Dilute to 1000 mL with Deionized Water.
Adjust the pH to 1.50.

In use, the improved method for detecting and quantifying filming amines in liquid samples using the above-described reagents comprises the following steps.

First: Sample Preparation Rinse and till a 25 mm sample cell to 10 mL mark with liquid sample containing filming amines.

Second: Colorimeter Calibration

Use the foregoing sample cell to zero the colorimeter.

Third: Add and Combine Indicator Reagent A and Buffer Reagent B

Add 0.5 ml of reagent A and 0.5 ml of reagent B to the sample cell. Mix the sample and wait 2 minutes. If filming amines are present in the sample, they will complex with rose bengal forming a pink color. The pink colored complex remains soluble in water thanks to the hydroxypropyl cellulose and does not precipitate.

Fourth: Colorimeter Reading

Place the sample cell in the colorimeter and read absorbance at 560 nm or 570 nm. The absorbance reading is converted to concentration by using a calibration curve obtained by measuring a series of filming amine standard solutions.

Direct Photometric Determination

Direct photometric determination of the colored complexes in aqueous solution is possible. Photometric detection can be made in a simple photometric measuring device using an ordinary LED source. The measuring is executed at a wavelength of between 540 to 580 nm.

The method as described above does not show any selectivity against any other components which might be present within the liquid solution, such as the feed-water, like e.g. ammonia, cyclohexylamine, ethanolamine, morpholine, and the like.

A specific example of the present method and composition is herein described with reference to the below Example and chart:

Example 1

| | |
|---|---|
| Test | (Z)-N-9-Octadecenylpropane-1,3-diamine (Oleyltrimethylenediamine) (N-Oleyl-1,3-diaminopropane) |
| Range | 0-5 ppm |
| Detection Limit | 0.13 ppm |
| Precision | 0.12 ppm |
| Chemical Formula | $C_{21}H_{44}N_2$ |
| Wavelength | 570 nm |
| Calibration | $Y = 3.6132x - 0.1222$ |
| | $R^2 = 0.9969$ |
| Reagents | Rose Bengal (Filming Amine Reagent - A) |
| | Buffer Reagent (Filming Amine Reagent - B) |

| | |
|---|---|
| Apparatus | 1 × 20 mL cell<br>2 × 1/2 mL pipette |
| Reagent<br>Shelf-life | Filming Amine - Reagent A - Standard Shelf-life, 2 years<br>Filming Amine - Reagent B - Standard Shelf-life, 2 years |
| Procedure | 1. Turn on the Colorimeter (Taylor ® TTi ™ 3000 Colorimeter Portable Colorimeter preprogrammed)<br>2. Select a test menu (ALL TESTS, RECENT TESTS, or FAVORITES) containing Filming Amines using ◆▶.<br>3. Select Filming Amines using ▲▼; then press ENTER ⊙.<br>4. Rinse and fill 25 mm sample cell to 10 mL mark with sample; then cap.<br>5. Insert sample cell into sample cell compartment. Align marks per User's Manual.<br>6. Select ZERO using ◆▶; then press ENTER ⊙. Zero will be displayed.<br>7. Remove sample cell from sample cell compartment; then remove cap.<br>8. Add 0.5 mL Filming Amines - Reagent A; then swirl to mix.<br>9. Add 0.5 mL Filming Amines - Reagent B; then cap and swirl to mix thoroughly.<br>10. Cap and swirl to mix.<br>11. Place cell in colorimeter.<br>12. Make sure "TIMER" is highlighted and press the "○" key. If "TIMER" is not highlighted, highlight it using the "◆▶" keys.<br>13. With "START" highlighted, press the "○" key.<br>14. Select "AUTO"<br>15. After a two-minute wait time the colorimeter will automatically take a reading and the result will be displayed as ppm Oleyltrimethylenediamine. |
| Interferences | The following were found to cause interference:<br>Alkalinity ≥ 400 ppm-positive interference<br>Iron Ferric-all levels-negative interference<br>Iron Ferrous ≥ 4 ppm-negative interference<br>Phosphonate-all levels-negative interference<br>Polyphosphate-all levels-negative interference<br>Polymer (PAA)-all levels-negative interference<br>Copper-all levels-negative interference<br>The following were tested up to and found not to cause interference:<br>Chloride-1000 ppm<br>EDTA-20 ppm<br>Molybdate-50 ppm<br>Phosphate-100 ppm<br>Silica-50 ppm<br>Sulfate-500 ppm<br>Sulfite-00 ppm<br>*Based on Interferences causing 10% or more interference |
| Advantages | The hydroxypropyl cellulose eliminates precipitate that forms, individual calibration curves were established for three main filming amines that are programed on colorimeter. The present test proved more accurate and precise. |

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A composition for photometric quantification of filming amines in liquids, comprising: an acidic buffer; and an indicator reagent complex that is reactive that is reactive with filming amines at an acidic pH to produce a color indicative of filming amine concentration, said indicator reagent complex including an indicator reagent and an aqueous modifier configured to prevent the acidic buffer from causing the indicator complex to precipitate, thereby maintaining the indicator complex in solution.

2. The composition for photometric quantification of filming amines in liquids according to claim 1, wherein said indicator reagent comprises rose bengal.

3. The composition for photometric quantification of filming amines in liquids according to claim 2, wherein said indicator reagent comprises rose bengal within a range of from 0.025% to 0.075%.

4. The composition for photometric quantification of filming amines in liquids according to claim 3, wherein said indicator reagent comprises approximately 0.05% rose bengal.

5. The composition for photometric quantification of filming amines in liquids according to claim 1, wherein said acidic buffer comprises citrate.

6. The composition for photometric quantification of filming amines in liquids according to claim 1, wherein said aqueous modifier comprises a hydrophilic polymer.

7. The composition for photometric quantification of filming amines in liquids according to claim 6, wherein said hydrophilic polymer is non-ionic.

8. The composition for photometric quantification of filming amines in liquids according to claim 7, wherein said hydrophilic polymer is plant-derived.

9. The composition for photometric quantification of filming amines in liquids according to claim 7, wherein said hydrophilic polymer is microbial.

10. The composition for photometric quantification of filming amines in liquids according to claim 7, wherein said hydrophilic polymer is synthetic.

11. The composition for photometric quantification of filming amines in liquids according to claim 1, wherein said aqueous modifier comprises any one from a group consisting of hydroxyethylcellulose (HEC), poly(ethylene)oxide (PEO), and hydroxypropyl cellulose (HPC).

12. The composition for photometric quantification of filming amines in liquids according to claim 1, wherein said aqueous modifier comprises hydroxypropyl cellulose (HPC).

13. The composition for photometric quantification of filming amines in liquids according to claim 12, wherein said aqueous modifier comprises approximately 3 g hydroxypropyl cellulose (HPC) per 1000 ml of reagent.

14. The composition for photometric quantification of filming amines in liquids according to claim 1, wherein said acidic buffer comprises citric acid monohydrate.

15. The composition for photometric quantification of filming amines in liquids according to claim 14, wherein said acidic buffer comprises approximately 15% citric acid monohydrate in deionized water.

16. A method for the photometric determination of a film-forming amine in liquid by adding an indicator reagent to an aqueous system that is pH dependent, combining a water soluble non-ionic polymer to modify the rheology of the aqueous system, and adding an acidic buffer to said aqueous system to lower pH and activate said indicator reagent, said water soluble polymer keeping the indicator reagent in solution despite the acidic buffer and preventing the said indicator reagent from precipitating out.

17. The method of claim 16 wherein said acidic buffer comprises citrate.

18. The method of claim 16 wherein said water-soluble polymer comprises any one from a group consisting of hydroxyethylcellulose (HEC), poly(ethylene)oxide (PEO), and hydroxypropyl cellulose (HPC).

* * * * *